(12) United States Patent
Chiu et al.

(10) Patent No.: US 7,050,294 B2
(45) Date of Patent: May 23, 2006

(54) LCD PANEL POP-UP STRUCTURE FOR A NOTEBOOK PC

(75) Inventors: Ching-Hsiang Chiu, Hsin Chuang (TW); Wen-Shu Lee, San Chung (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 0 days.

(21) Appl. No.: 11/023,534

(22) Filed: Dec. 29, 2004

(65) Prior Publication Data

US 2005/0185369 A1  Aug. 25, 2005

(30) Foreign Application Priority Data

Feb. 23, 2004  (TW) ............................. 93104487 A

(51) Int. Cl.
*G06F 1/16* (2006.01)
(52) U.S. Cl. ...................................... 361/681; 361/683
(58) Field of Classification Search ................ 361/681, 361/683

See application file for complete search history.

(56) References Cited

U.S. PATENT DOCUMENTS

| | | | | |
|---|---|---|---|---|
| 5,198,966 A | * | 3/1993 | Kobayashi et al. | ......... 361/681 |
| 6,076,869 A | * | 6/2000 | Chen et al. | ................. 292/202 |
| 6,129,395 A | * | 10/2000 | Schlesener et al. | ......... 292/128 |
| 6,570,757 B1 | * | 5/2003 | DiFonzo et al. | ............ 361/683 |
| 6,707,665 B1 | * | 3/2004 | Hsu et al. | .................... 361/681 |
| 6,762,928 B1 | * | 7/2004 | Lo | .............................. 361/681 |
| 2002/0089190 A1 | * | 7/2002 | Wang et al. | ............. 292/251.5 |

* cited by examiner

*Primary Examiner*—Lisa Lea-Edmonds
(74) *Attorney, Agent, or Firm*—Rabin & Berdo, PC

(57) ABSTRACT

An LCD panel pop-up structure is applied in a notebook computer. The LCD panel pop-up structure can be integrated into a touch pad base support by redesigning its structure. The touch pad base is built inside a notebook PC's mainframe. An arched resilient plate is secured in a recess of the touch pad base. An opening on the notebook PC's mainframe is aligned with the arched resilient plate and a latch of the LCD panel. When the LCD panel is folded down, a latch is lead through the opening and the arched resilient plate is deformed by pressure from the latch. A recovery force of the arched resilient plate serves as a pop-up force for the LCD panel.

8 Claims, 2 Drawing Sheets

LCD PANEL POP-UP STRUCTURE FOR A NOTEBOOK PC

RELATED APPLICATIONS

The present application is based on, and claims priority from, Taiwan Application Serial Number 93104487, filed Feb. 23, 2004, the disclosure of which is hereby incorporated by reference herein in its entirety.

BACKGROUND

1. Field of Invention

The present invention relates to a pop-up structure of a notebook PC. More particularly, the present invention relates to an LCD panel pop-up structure for a notebook PC.

2. Description of Related Art

Portable computing systems are gradually changing and developing into several types of systems. The present type of system is a notebook PC, which continues to reduce its weight and to enhance its calculation capability so as to increase a notebook PC's production efficiency.

In addition to enhancing calculation capability, a notebook PC is also evolving in its structural design. The structural design improvement not only makes the notebook PC easy to use, but also makes it easy to assemble.

When an LCD panel of a notebook PC is folded down, a switch is designed at the edge of the LCD panel so as to attach itself to a mainframe. When a user wants to use the notebook PC, the switch is unlocked to raise the LCD panel to an upright position.

As large size LCD panels are gradually applied in notebook PCs, it takes more effort to open an LCD panel for users, especially for female users. To solve this issue, an opening assist apparatus is essential for a notebook PC.

SUMMARY

It is therefore an objective of the present invention to provide an LCD panel pop-up structure of a notebook PC, so as to open an LCD panel conveniently and easily.

In accordance with the foregoing and other objectives of the present invention, an LCD panel pop-up structure is applied in a notebook computer. The LCD panel pop-up structure can be integrated into a touch pad base support by redesigning the structure thereof. The touch pad base is built inside a notebook PC's mainframe. An arched resilient plate is secured in a recess of the touch pad base. An opening on the notebook PC's mainframe is aligned with the arched resilient plate and a latch of the LCD panel. When the LCD panel is folded down, a latch is lead through the opening and the arched resilient plate is deformed by pressure of the latch. A recovery force of the arched resilient plate serves as a pop-up force for the LCD panel.

Thus, the LCD panel pop-up structure of a notebook PC redesigns the touch pad base and integrates it with a pop-up spring apparatus so as to reduce the volume of the LCD panel pop-up structure. The pop-up spring apparatus is simplified into a single element—an arched resilient plate—which attaches the touch pad base easily and quickly.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
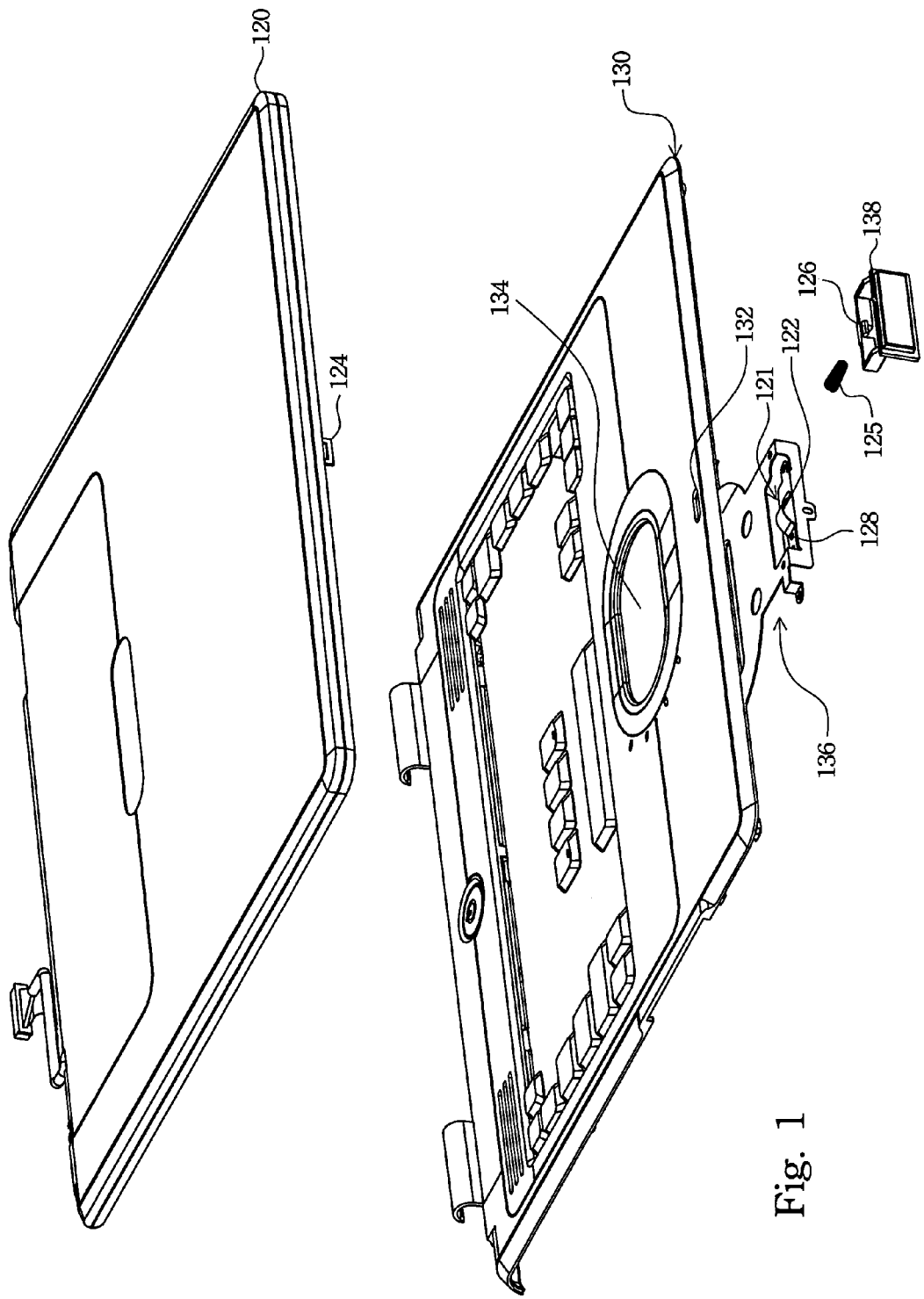
FIG. 1 illustrates a structure perspective view of an LCD panel pop-up structure for a notebook PC according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

In order to make an LCD panel easier to open, easier to assemble and occupy less space, the present invention discloses an inventive touch pad base, which replaces a conventional touch pad base and an opening assist apparatus. An arched resilient plate serves as a pop-up spring apparatus, which is easily assembled.

FIG. 1 illustrates a structure perspective view of an LCD panel pop-up structure for a notebook PC according to one preferred embodiment of this invention. A redesigned touch pad base 136 includes a recess 121, which accommodates an opening assist apparatus. This design integrates a touch pad base 136 with an opening assist apparatus, which may occupy less space. The opening assist apparatus is a single element, an arched resilient plate 122.

Figure 2:
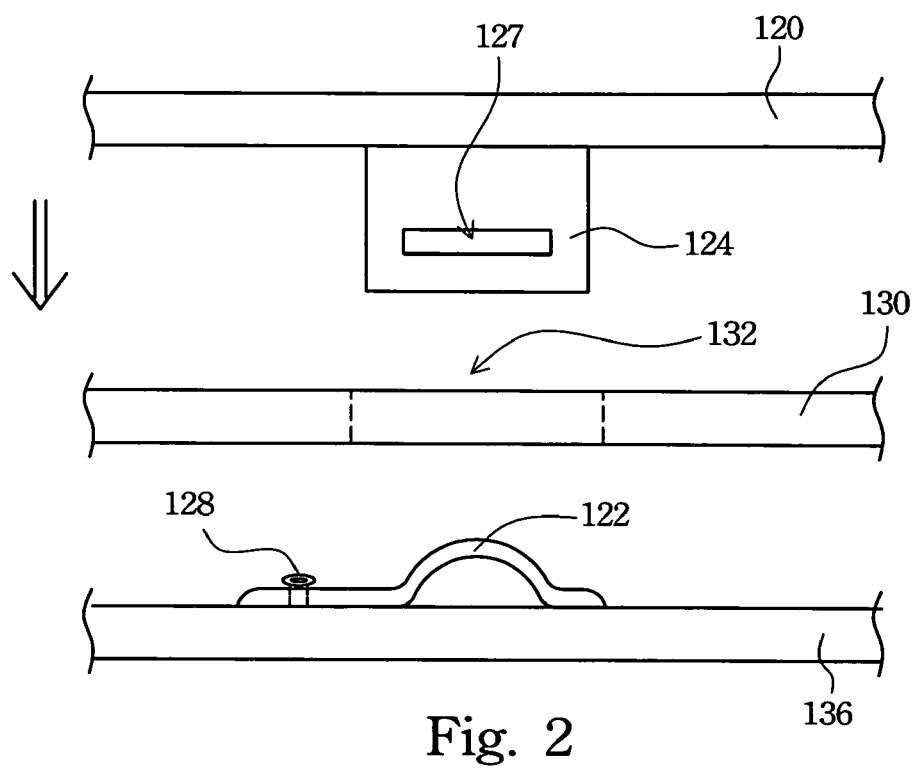
FIGS. 2 and 3 illustrate detailed views of an LCD panel pop-up structure for a notebook PC according to one preferred embodiment of this invention.

When an LCD panel 120 is folded down against a mainframe 130, a latch 124 of the LCD panel 120 is lead through an opening 132. The latch 124 presses the arched resilient plate 122 until it is deformed. The pop-up force for the LCD panel comes from the arched resilient plate 122 recovering from deformation. The arched resilient plate 122 is secured to a bottom of the recess 121 of the touch pad base 136 with one end by means of screws 128. FIG. 2 illustrates a detailed view of an LCD panel pop-up structure for a notebook PC according to one preferred embodiment of this invention. The touch pad base 136 is positioned under a touch pad 134 (also inside the mainframe 130). There is an opening 132, on the mainframe 130 and corresponding to the latch 124, right above the arched resilient plate 122. When the LCD panel 120 is folded downward and almost against the mainframe 130, the latch 124 is lead to press the arched resilient plate 122 through the opening 132.

Figure 3:
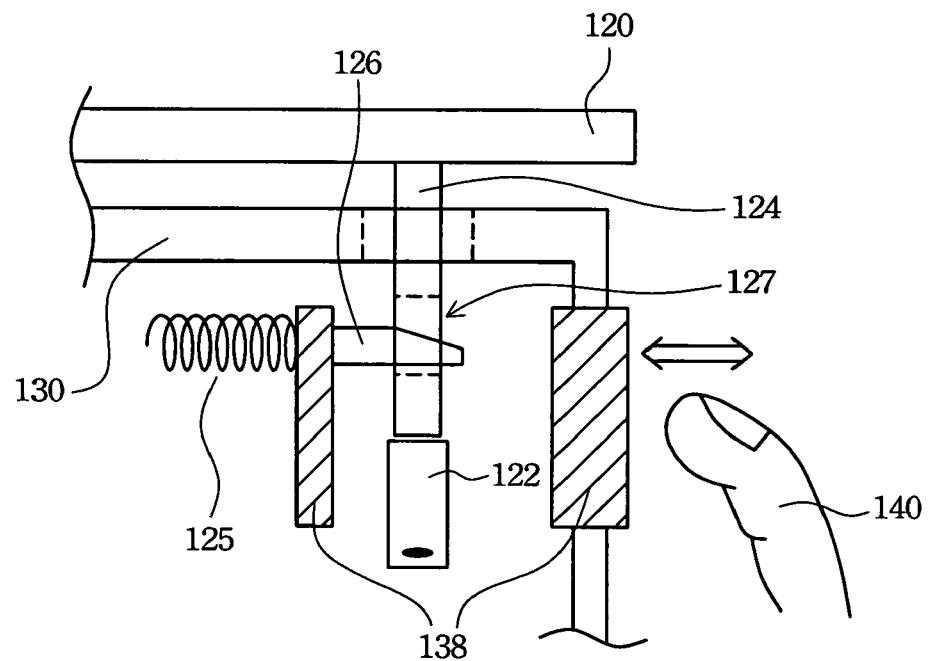

FIG. 3 illustrates another detailed view of an LCD panel pop-up structure for a notebook PC according to one preferred embodiment of this invention. When the LCD panel 120 is folded downward, a further switch 138 is needed to lock (or clamp) or unlock the LCD panel 120. The switch 138 includes a rib 126 to block a square hole 127 on the latch 124. A balanced force of a finger 140 and a spring 125 controls the switch 138 so as to lock (or clamp) or unlock the LCD panel 120. When a push force of the finger 140 is greater than that of the spring 125, the rib 126 slips out of the square hole 127 on the latch 124, the arched resilient plate 122 recovers from deformation and pops up the latch 124 (and the LCD panel 120).

According to preferred embodiments of present invention, the LCD panel pop-up structure for a notebook PC redesigns the touch pad base and integrates the same with a pop-up spring apparatus so as to reduce the volume of the LCD panel pop-up structure. The pop-up spring apparatus is simplified into a single element—an arched resilient plate—which can be attached the touch pad base easily and quickly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LCD panel pop-up structure for a notebook PC with an LCD panel pivotally connected to a mainframe, said LCD panel pop-up structure comprising:
    a latch, fixed to said LCD panel;
    a touch pad base, built inside the mainframe having an opening corresponding to said latch; and
    an arched resilient plate, positioned under the opening, one end thereof being secured on said touch pad base, wherein said latch moves downward through the opening and presses said arched resilient plate, and deformation of said arched resilient plate saves energy for pop-up when the LCD panel is folded against the mainframe, the LCD panel being popped up when said arched resilient plate recovers from deformation and pops up said latch.

2. The LCD panel pop-up structure of claim 1, wherein said latch comprises a hole.

3. The LCD panel pop-up structure of claim 1, wherein said arched resilient plate is secured to said touch pad base by means of screws.

4. The LCD panel pop-up structure of claim 1, wherein said touch pad base comprises a recess to accommodate said arched resilient plate.

5. An LCD panel pop-up structure for a notebook PC with an LCD panel pivotally connected with a mainframe, said LCD panel pop-up structure comprising:
    a latch, fixed to said LCD panel;
    a touch pad base, built inside the mainframe having an opening corresponding to said latch;
    an arched resilient plate, positioned under the opening, wherein one end thereof is secured on said touch pad base; and
    a switch, positioned adjacent to said touch pad base, said switch having a rib positioned between said arched resilient plate and the opening to clamp said latch;
    wherein said latch moves downward through the opening and presses said arched resilient plate, and energy for pop-up is saved by deformation of said arched resilient plate when the LCD panel is folded down.

6. The LCD panel pop-up structure of claim 5, wherein said latch comprises a hole.

7. The LCD panel pop-up structure of claim 5, wherein said arched resilient plate is secured to said touch pad base by means of screws.

8. The LCD panel pop-up structure of claim 5, wherein said touch pad base comprises a recess to accommodate said arched resilient plate.

* * * * *